(No Model.)
H. H. WAIT.
INSTRUMENT WINDING DEVICE.
No. 605,154. Patented June 7, 1898.
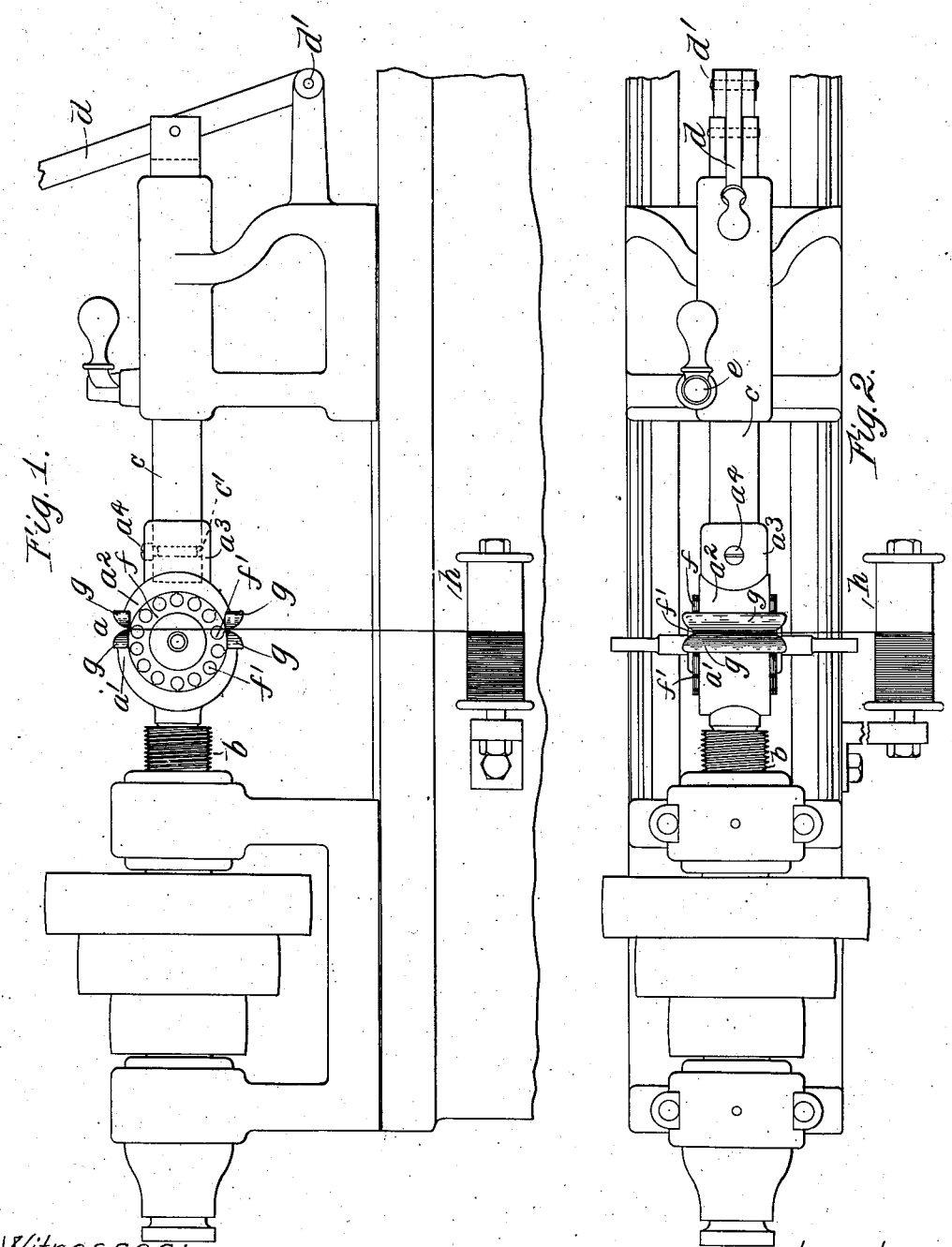
Witnesses:
Inventor:
Henry H. Wait,
By Barton Brown
Attorneys.

UNITED STATES PATENT OFFICE.

HENRY H. WAIT, OF CHICAGO, ILLINOIS, ASSIGNOR TO THE WESTERN ELECTRIC COMPANY, OF SAME PLACE.

INSTRUMENT-WINDING DEVICE.

SPECIFICATION forming part of Letters Patent No. 605,154, dated June 7, 1898.

Application filed December 14, 1896. Serial No. 615,707. (No model.)

*To all whom it may concern:*

Be it known that I, HENRY H. WAIT, a citizen of the United States, residing at Chicago, in the county of Cook and State of Illinois, have invented a certain new and useful Improvement in Instrument-Winding Machines, of which the following is a full, clear, concise, and exact description, reference being had to the accompanying drawings, forming a part of this specification.

My invention has for its object the provision of improved means for winding electrical conductors about the cores of electromagnets, and is particularly applicable to the winding of the armatures of dynamo-electric machines.

I have employed my invention in winding iron-clad armatures of the drum-type, longitudinal slots being provided in the armature-cores parallel with their axes, adapted to receive the armature-coils.

In adapting my invention to the winding of armatures of dynamo-electric machines I have mounted the armature-core in a two-part chuck, secured to the live and dead spindles of a lathe in a manner to cause said core to rotate in a plane coincident with its normal axis, opposite slots in the core lying in a plane parallel to the plane of rotation. I provide guides formed, preferably, in the chuck, which are adapted to be associated with slots in the drum-armature core for the purpose of directing the wire into said slots.

I will describe my invention more particularly with reference to the accompanying drawings, which illustrate the preferred form of my invention, in which—

Figure 1 is an elevation of a portion of a lathe, the head and tail-stocks whereof support the chuck constructed in accordance with my invention. Fig. 2 is a plan view thereof.

Like letters indicate like parts in both views.

A metal chuck $a$ is composed of two sections or jaws $a'$ $a^2$, which are secured, respectively, to the live-spindle $b$ and dead-spindle $c$ of a lathe. Section $a'$ is rigidly secured to the live-spindle, as shown. Section $a^2$ of the chuck is provided with a cylindrical extension $a^3$, adapted to receive one end of the dead-spindle $c$. Spindle $c$ is provided with an annular groove $c'$, which engages a stud $a^4$, secured to said extension $a^3$. The chuck is thus capable of being rotated by the live-spindle, while the dead-spindle remains in a fixed position. The dead-spindle is connected with a lever $d$, pivoted at $d'$. By shifting this lever the dead-spindle may be reciprocated to separate or bring the jaws $a'$ $a^2$ together to remove or engage the core. The dead-spindle may be secured in adjustment by the well-known clamping device $e$.

My invention has been particularly employed in the winding of armature-cores of the type illustrated. The core $f$ is constructed of laminæ of sheet-iron or mild steel, each sheet having circular holes near the periphery thereof, slots being provided in said periphery which communicate with said holes. In assembling the core-plates these slots and holes are alined, longitudinal recesses $f'$ being thus provided in the core adapted to receive the armature-wire.

The armature-core is disposed within the chuck, with opposite recesses, in which a coil of wire is to be disposed, placed between the opposing lips $g$ $g$ of the chuck-jaws. The opposing surfaces of the lips $g$ $g$ recede from the recesses $f'$ $f'$, interposed between said lips, whereby funnel or trough-like guides are formed. The ends of the lips are rounded to guide the wire between the lips, said lips in turn guiding the wire into the recesses. In winding the armature the live-spindle of the lathe is rotated by any suitable means, the armature-core being thereby rotated in a plane coincident with its normal axis. The armature-wire is attached at one end to the core and is unwound from its bobbin $h$ as the core is rotated, said wire being held in the hand of the operator in a position to be guided within the opposite recesses in the core by the chuck-jaws, as described. After one coil has been wound upon the core the jaw $a^2$ is withdrawn from jaw $a'$ and the core turned to present the next succeeding recesses therein to the armature-wire, the jaw $a^2$ being readvanced to secure the core in its newly-adjusted position.

I have purposely omitted the enumeration of many modifications which may be made without departing from the spirit of my invention, because to set these forth at length would obscure rather than make clear the more essential features.

Having, however, fully set forth one form of mechanism embodying my invention, I claim and desire to secure by Letters Patent the following:

1. In an instrument-winding device, a chuck formed in two parts or sections which are adapted to engage a core, each of said parts being provided with a lip, said lips being oppositely placed, the opposing surfaces of the lips diverging outwardly from the core-receiving surfaces of the chuck, substantially as described.

2. The combination of a chuck formed in two parts or sections which are adapted to engage a core, with two diametrically opposite lips provided upon each section, the lips upon one section being opposed to the lips upon the other section, while the opposing surfaces of said lips diverge outwardly from the core-receiving surfaces of the chuck, substantially as and for the purpose set forth.

3. The combination of a chuck formed in two parts or sections which are adapted to engage a core, with two diametrically opposite lips provided upon each section, the ends whereof are rounded, the lips upon one section being opposed to the lips upon the other section while the opposing surfaces of said lips diverge outwardly from the core-receiving surfaces of the chuck, substantially as and for the purposes specified.

4. In an instrument-winding device, a chuck formed in two parts which may be closed together to secure a core between them and separated to remove said core, the members of said chuck being provided with opposing lips constructed to direct wire upon said core, substantially as described.

5. In an instrument-winding device, the combination with a chuck, of means for causing the rotation thereof with relation to the material that is to be wound upon the core in a plane substantially parallel with the plane of the winding, and diametrically-opposed lips provided upon said chuck at the places where the material is to be wound upon the core, said lips being constructed to direct the material upon the core as the core is relatively rotated, substantially as described.

In witness whereof I hereunto subscribe my name this 21st day of September, A. D. 1896.

HENRY H. WAIT.

Witnesses:
GEORGE L. CRAGG,
JOHN W. SINCLAIR.